Patented Nov. 28, 1950

2,531,451

UNITED STATES PATENT OFFICE 2,531,451

WATER PURIFICATION

Franz J. Maier, Bethesda, Md.

No Drawing. Application October 7, 1947,
Serial No. 778,451

1 Claim. (Cl. 210—23)

(Granted under the act of March 3, 1883, as
amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to the purification of water and particularly it relates to the removal of soluble substances containing fluorides from water systems to render said water potable.

It is known that the presence of an excessive concentration of soluble fluoride containing compounds generally fluorides in potable waters causes chronic endemic dental fluorosis when used during the period of calcification of the permanent teeth. Fluorosis is a disfiguring hypoplasia of the permanent teeth which ranges from chalky white to black stains on the enamel to actual attrition of the enamel. As little as 6.0 p. p. m. fluorides in a communal water supply is known to produce fluorosis in all children using this water. It has further been demonstrated that the presence of such substances in potable waters is to some degree beneficial in that it greatly inhibits dental caries. Studies of the two conflicting concepts have led to the conclusion that the presence of soluble fluoride containing substances, wherein the concentration is of the order of about 1 to 1.5 parts per million of the fluoride ion in water are desirable in that caries will be inhibited while the incidence of fluorosis is negligible. In some water systems the fluoride containing substances are present in concentrations as high as 15 to 20 parts per million of the fluoride ion. Methods for the removal of such fluoride containing substances from water have been investigated and have been found to be unsatisfactory in that the consumption of reagents has been excessive and it is difficult to control the removal to the extent that the beneficial concentration of soluble fluoride containing substances will remain in the treated water.

Accordingly it is an object of this invention to provide a simple and economical method for the removal of soluble fluoride containing substances from communal water supplies. It is another object to provide a method for controlling the removal of soluble fluoride containing substances from water so that a beneficial concentration thereof will be present in the treated water. Other objects and advantages will be apparent as will appear hereinafter.

These objects are accomplished in accordance with this invention by certain improvements in method for removing soluble fluoride containing substances from water involving treatment of water with a turbidifier and a coagulant under conditions of controlled hydrogen-ion concentration, said improvement comprising the removal of said fluoride substances in a plurality of stages by a plurality of incremental treatments of said water with said reagents whereby the consumption of said reagents is decreased substantially.

Suitable turbidifiers for purposes of the invention include finely divided water-insoluble substances which can be readily dispersed in water and which facilitate the chemical reactions of the other ingredients and which serve to increase the speed of flocculation and subsequent settling of the floc. Such substances as clays, earths, finely divided carbonaceous materials, and the like are presently preferred for economic reasons. Many raw waters will contain sufficient naturally occurring suspended solids to preclude the necessity of adding additional turbidifying materials. The quantity of the turbidifier required need only be sufficient to provide an improved nucleus for the floc and to contribute a sufficient increase to the specific gravity of the floc in order to give an increased rate of settling.

Substances giving similar desirable floc building characteristics to the process, such as activated silica sols in their various forms have been found to have a further fluoride removal phenomenon when used with the turbidifier and the coagulant.

Suitable coagulants for purposes of the invention include aluminum sulfate, aluminum ammonium sulfate, aluminum potassium sulfate, and the like alums capable of forming voluminous fluoride adsorbent flocs in mildly acid solution. Alum, common aluminum sulfate is presently preferred because of the ease of handling and economies resulting from its use.

The coagulent and turbidifier can be added to the raw water in any desired manner as solids, solutions, or suspensions. Adding then as solutions and suspensions by means of mechanical proportioners has been found to be an effective method and is presently preferred. The order of blending is not critical; the turbidifier can be added first and then the coagulant may be added; the coagulant may be added first and the turbidifier later; or the two may be mixed together and then added concurrently.

When alum is employed as the coagulant, fluoride removal can be achieved over a fairly wide pH range, however efficient removal is accomplished within a pH range between about 6.0 to 7.0; and the optimum pH appears to be between about 6.2 and 6.8. Exceedingly large alum dosages have been found capable of removing fluorides as pHs as low as about 5.0 and high as about 8.7 but such are uneconomical. The pH can be controlled by the addition of suitable reagents; the choice between alkaline or acid materials will be determined by the pH of the raw water after the addition of the coagulant and turbidifier. For reasons of economy, materials such as lime, caustic soda, soda ash, sulfuric acid, hydrochloric acid, and the like are preferred; however, the invention is not limited thereto.

If activated silica sols are employed to obtain a further reduction in the amounts of alums and hydrogen ion controlling agents to realize a comparable fluoride reduction, it is advisable to have mixing zones in series. The first zone would be used for forming a pin point floc with the alum and clay solutions while the second zone, receiving the treated water from the first, would mix with the silica solution. The ratio of amounts of activated silica to alum generally vary between about 5 to 15% but is not limited to this amount. It is obvious that the best ratio will depend on the characteristics of the raw water and will vary considerably between different sources of water supply.

The design of the plant for the utilization of the invention will depend on the fluoride concentration of the raw water. Fluoride containing waters rarely contain over 20 p. p. m. fluorides and generally contain up to about 8 p. p. m. fluorides. In the treatment of a 5 to 8 p. p. m. fluoride water, in accordance with this invention, the fluoride concentration of the raw water is first decreased to about 3.5 p. p. m. and then thus treated water is subjected to another similar fluoride removal treatment whereby water having a residual fluoride concentration of 1.0 to 1.5 p. p. m. will result. The removal can be accomplished as a batch of continuous process.

In a continuous operation to reduce the fluorides from about 6 p. p. m. to 3.5 p. p. m., alum is continuously blended with the raw water at such a rate as will maintain an alum concentration in the influent of between about 90 to 125 p. p. m. Concurrently a turbidifying reagent is blended with the influent so that up to 100 p. p. m. of the turbidifier are dispersed in the influent. Sufficient pH controlling reagent is then added to the system to adjust and maintain the pH between about 6.2 to 6.8. The influent is thereafter mildly agitated while the floc is forming and then introduced into a quiescent zone wherein the floc is permitted to settle. The water in passing thru the flocculation zone should be detained for a sufficient time to insure the desired fluoride removal; usually about ¾ to 1½ hours detention has been found sufficient to lower the fluoride concentration from about 6.0 to 3.5 p. p. m. Thereafter the water which has passed through the quiescent zone and separated from the floc may be filtered or otherwise treated for further clarification. The thus treated water is thereafter subjected to similar chemical treatment and a second flocculation and resubjected to the same treatment as in the first quiescent zone. The effluent water from this second stage or zone after separation from the suspended materials will be found to have a fluoride concentration of about 1.0 to 1.5 p. p. m. The separation of the suspended materials can be easily accomplished by means normally adapted to such ends, for example, settling, decanting, filtration, and the like.

When the influent has a fluoride concentration much greater than about 8 p. p. m., say for example about 12 to 15 p. p. m. fluorides, the fluoride removal can be accomplished in several incremental stages; first, lowering the fluoride from 15 to 8 p. p. m.; then from 8 to 4 p. p. m.; and finally from 4 to 1 p. p. m.

Water containing even greater fluoride concentration can be treated in accordance with this invention by increasing the number of incremental treatment stages.

The following examples show how the invention may be carried out but it is not limited thereto.

Example I

Water tapped from the conduits leading to the Dalecarlia Reservoir from the Potomac River on the Washington, D. C., water supply system was continuously blended with sufficient sodium fluoride to produce an artificial influent having a fluoride concentration of about 6 to 7 p. p. m. At the rate of 25 g. p. m. the water was passed through a 3" line wherein sufficient aluminum sulfate solution and a clay suspension, were added by proportional mechanical solution feeders to maintain a concentration of about 390 p. p. m. of alum and a turbidity equivalent to about 100 p. p. m. of clay in the influent. Thereafter sufficient sodium hydroxide solution was added to adjust and maintain the pH of the influent to about 6.7. The influent was led into the bottom of a 580 gallon mixing basin. The basins were agitated by nine 26" paddles rotating at a tip speed of about 0.46 foot per second. The overflow from this basin led to a second similar basin wherein the principal flocculation occurred. The paddles in the second basin were operated at tip speed of about 0.23 foot per second. The thus treated water was removed from the bottom of the second flocculating basin and allowed to pass through a 495 gallon stilling and distribution section before entering the settling tank through the 42, 4" x 2" ports in the bulkhead of this section. The settling tank held 9400 gallons. A rectangular weir at the end of the settling tank permitted the settled water to enter the filter. The filter was a rapid-sand-mechanical filter of 25 square feet and comprised 30" of sand over 15" of graded gravel and an underdrain system. The water was filtered at a rate of about 1.0 g. p. m. per square foot. The water thus treated contained about about 1.0 p. p. m. fluorides.

Example II

Using Cincinnati city water treated with sodium fluoride to produce fluoride concentrations between 3.5 and 7.0 p. p. m. the process was used in an improvised sludge blanket type of pilot plant. This plant included two mixing basins in series. The raw water was first mixed with the alum, clay and caustic solutions until a pinpoint floc was formed. In the second basin the effluent from the first was mixed with solutions of activated silica sol. The thus chemically treated water then flowed into the down-draft tube suspended in the center of a pyramidal tank which provided a detention period of 40 minutes at a flow of 10 g. p. m. The down-draft tube encased a series of slow-moving paddles for flocculation purposes. On leaving the down-draft tube the water then flowed upward through the sludge blanket formed from the floc previously removed from the water. Above the sludge blanket the treated water overflowed the weir around the periphery of the upper edge of the tank. The results of experiments using this equipment when no silica was used indicate that waters containing 6.2 p. p. m. fluorides was reduced to 3.5 p. p. m. fluorides using 100 p. p. m. alum, 110 p. p. m. clay and 25 p. p. m. lime. When the water containing 3.5 p. p. m. fluorides was dosed with about the same quantities of chemicals the effluent contained between 1.0 and 1.3 p. p. m. fluorides. When using the activated silica sols a further reduction of up to 20% in fluorides was noted when the same quantities of other chemicals were used.

*Example III*

Laboratory tests to demonstrate the efficiency of the invention were carried out in the following manner:

Solutions of various clays, earths, coagulants and other reagents were added to measured quantities of various raw water. Each test was based on liter quantities of raw water of which six portions were treated simultaneously.

Waters naturally containing fluorides in concentrations between 5.0 and 7.8 p. p. m. were used together with treated city water and distilled water dosed with fluorides in concentrations between 3.5 and 12.0 p. p. m. Various fluoride containing compounds were used for this purpose. These include sodium fluoride, calcium fluoride, barium fluoride, magnesium fluoride, aluminum fluoride, sodium silicofluoride, barium silicofluoride, potassium fluoride and cryolite. Sodium fluoride, however, was used in most experiments because of its accurately known purity and higher solubility.

Various coagulants were used including aluminum sulfate, aluminum ammonium sulfate, potassium aluminum sulfate, ferric sulfate, titanium tetrachloride, phosphoric acid and lime, magnesium sulfate and soda ash, black alum, chromium chloride, sodium pyrophosphate, titanium trichloride, chromic ammonium sulfate, chromic potassium sulfate, ferric ammonium sulfate.

Aluminum sulfate (filter alum) is preferred because of its relative ease in handling and for economic reasons.

Among the turbidifiers used were: various brick clays (200 mesh) Wyoming bentonites (200 mesh and 400 mesh), calcined California diatomaceous earths, Georgia bentonites, Georgia kaolin (200 mesh), and various bleaching clays. In general red brick clay was preferred because of its universal accessibility and low cost.

Solutions of calcium oxide, sodium carbonate or sodium hydroxide were used for hydrogen ion adjustment. They apparently are equally efficient from the standpoint of fluoride removal in the process provided the optimum pH is maintained. Because of its economy, lime was used in most of the experiments.

Activated silicate sols were formed from solutions of sodium silicates and adjusted with either sulfuric acid or ammonium sulfate to the optimum alkalinity.

Generally, after the addition of chemicals, a rapid mix lasting one minute was provided followed by flocculation for one hour. Settling was continued until a clear supernatant liquor could be obtained for the fluoride test. The Scott modification of the Sanchis procedure was used for determining the fluoride concentrations in most of the experiments.

Where activated silica sols were used in the ratios of 5 to 15 percent of the alum dosages, increased fluoride reductions amounting to 25% were noted.

The results are tabulated in part in Table I below.

TABLE I

*Effect of incremental reagent addition in fluoride removal*

| Increment | p. p. m. alum to reduce Fluoride concentration | | | |
| --- | --- | --- | --- | --- |
| | 12.0 to 1.0 | 12.0 to 6.0 to 3.5 to 1.0 | 6.5 to 1.0 | 6.5 to 3.5 to 1.0 |
| 1 | 1,000 | 200 | 390 | 101 |
| 2 | | 90 | | 110 |
| 3 | | 110 | | |
| Total alum required | 1,000 | 400 | 390 | 211 |

As is clearly shown in Table I the alum consumption of the incremental or polystage fluoride removal process is much less than the single stage treatments; in the two stage lowering of fluorides from 6.5 to 1.0 a saving of approximately 50% results.

To demonstrate the effect of pH on fluoride removal, samples of water containing 6.0 p. p. m. fluorides were treated with 100, 250 and 400 p. p. m. alum and 100 p. p. m. clay in each instance, the pH of these samples were then adjusted by means of calcium to known values between 5.1 to 8.0. The samples were then agitated slowly for about 1.0 hour and then the suspended materials were separated from the supernatant liquor by settling. Fluoride concentration tests were made on the filtrates. The results are partially summarized below in Table II.

TABLE II

*Effect of pH on fluoride removal*

Residual fluoride (p. p. m.) after treatment of water containing 6.0 p. p. m. F

| Alum, p. p. m. pH | 100 | 250 | 400 |
| --- | --- | --- | --- |
| 5.1 | --- | 3.7 | 3.5 |
| 6.2 | 3.2 | --- | 1.3 |
| 6.4 | --- | 1.7 | --- |
| 6.5 | --- | 1.8 | --- |
| 6.6 | 3.2 | --- | --- |
| 6.7 | 3.3 | --- | 1.0 |
| 6.8 | 3.8 | 1.6 | --- |
| 6.9 | 3.9 | --- | 1.1 |
| 7.0 | 4.0 | 3.0 | --- |
| 7.2 | --- | 3.5 | --- |
| 7.5 | 5.0 | --- | --- |
| 8.0 | 5.4 | --- | 3.0 |

From the foregoing description and examples it is apparent that a simplified and more economical method for the removal of soluble fluoride containing substances from water has been developed and that the improved method also permits the control of fluoride concentrations of the treated water.

While the invention as particularly described related to the use of alum (aluminum sulfate) as the coagulant, it is not limited thereto, other coagulants such as various alums, and the like, have been found to remove fluorides more efficiently where the removal is made with coagulant aids and in a plurality of stages.

Since many widely differing embodiments of the invention will occur to one skilled in the art, the invention is not limited to the specific details illustrated and described and various changes can be made therein without departing from the spirit and scope thereof.

What is claimed is:

The method for the removal of fluoride ions from water which comprises the steps of treating a fluoride containing water with alum and clay at a pH of between about 6.0 to 7.0; adding an activated silica sol to the thus treated water; and permitting the water to pass thru the thus formed floc substantially as described.

FRANZ J. MAIER.

REFERENCES CITED

The following references are of record in the file of this patent:

UNITED STATES PATENTS

| Number | Name | Date |
| --- | --- | --- |
| 1,966,279 | Behrman | July 10, 1934 |
| 2,043,705 | Meinzer | June 9, 1936 |
| 2,059,553 | Churchill | Nov. 3, 1936 |
| 2,087,136 | Andrus | July 13, 1937 |
| 2,210,966 | Urbain et al. | Aug. 13, 1940 |
| 2,268,971 | Urbain et al. | Jan. 6, 1942 |
| 2,345,827 | Olin | Apr. 4, 1944 |